(12) United States Patent
Erikawa

(10) Patent No.: US 10,695,669 B2
(45) Date of Patent: Jun. 30, 2020

(54) GAME APPARATUS AND GAME CONTROL METHOD

(71) Applicant: KOEI TECMO GAMES CO., LTD., Kanagawa (JP)

(72) Inventor: Keiko Erikawa, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 98 days.

(21) Appl. No.: 16/303,920

(22) PCT Filed: Feb. 2, 2017

(86) PCT No.: PCT/JP2017/003850
§ 371 (c)(1),
(2) Date: Nov. 21, 2018

(87) PCT Pub. No.: WO2017/203750
PCT Pub. Date: Nov. 30, 2017

(65) Prior Publication Data
US 2020/0122027 A1    Apr. 23, 2020

Related U.S. Application Data

(60) Provisional application No. 62/341,250, filed on May 25, 2016.

(51) Int. Cl.
A63F 13/26    (2014.01)
A63F 13/285    (2014.01)

(52) U.S. Cl.
CPC ............ *A63F 13/285* (2014.09); *A63F 13/26* (2014.09); *A63F 2300/8082* (2013.01)

(58) Field of Classification Search
CPC . A63F 13/285; A63F 13/26; A63F 2300/8082
See application file for complete search history.

(56) References Cited

U.S. PATENT DOCUMENTS 3,064,364 A * 11/1962 Schueller ................. B64G 7/00
434/34
5,399,091 A    3/1995 Mitsumoto
(Continued)

FOREIGN PATENT DOCUMENTS

| JP | H02-030865 U | 2/1990 |
| JP | H05-303324 | 11/1993 |

(Continued)

OTHER PUBLICATIONS

Japanese Office Action for 2018-519082 dated Feb. 18, 2020.
(Continued)

*Primary Examiner* — Corbett B Coburn
(74) *Attorney, Agent, or Firm* — IPUSA, PLLC

(57) ABSTRACT

A game apparatus includes an enclosure including a controller, a display, an operation unit, and a riding part, wherein the game apparatus further includes at least one of an actuator for causing a user to perceive shaking or vibration and a supply unit for causing the user to perceive at least one of wind, water, smell, heat, a cooling sensation, and a tactile sensation, and wherein the controller controls content displayed on the display depending on a situation in a game and a change in a user's visual point, and the controller controls the actuator or the supply unit according to the situation in the game.

15 Claims, 9 Drawing Sheets

(56) References Cited

U.S. PATENT DOCUMENTS

| | | | | |
|---|---|---|---|---|
| 5,490,784 | A | * | 2/1996 | Carmein ................ A63B 22/02 434/29 |
| 5,515,078 | A | * | 5/1996 | Greschler ............... G06F 3/011 273/148 B |
| 5,727,186 | A | * | 3/1998 | Shervington ........... A61L 9/035 703/6 |
| 5,791,903 | A | * | 8/1998 | Feuer ...................... G09B 9/14 434/30 |
| 5,980,256 | A | * | 11/1999 | Carmein ................ A63B 22/02 434/29 |
| 6,354,954 | B1 | | 3/2002 | Sumner |
| 8,241,038 | B2 | * | 8/2012 | Quinn ..................... G09B 9/00 348/121 |
| 2001/0041326 | A1 | * | 11/2001 | Zeier ........................ G09B 9/14 434/33 |
| 2006/0135271 | A1 | | 6/2006 | Casey et al. |
| 2008/0093474 | A1 | * | 4/2008 | Suissa .................... A61L 9/125 239/34 |
| 2009/0163283 | A1 | * | 6/2009 | Childress ............... A63G 31/16 463/47 |
| 2013/0063487 | A1 | * | 3/2013 | Spiegel .................. G06Q 30/02 345/633 |
| 2014/0157916 | A1 | * | 6/2014 | Vatcher .................. A63G 31/16 74/51 |
| 2014/0361956 | A1 | * | 12/2014 | Mikhailov .............. A63F 13/42 345/8 |
| 2016/0195923 | A1 | * | 7/2016 | Nauseef .................. G06F 3/011 348/121 |
| 2016/0346693 | A1 | | 12/2016 | Minato et al. |
| 2019/0052475 | A1 | * | 2/2019 | Dorrendorf ........... G06F 15/173 |

FOREIGN PATENT DOCUMENTS

| | | |
|---|---|---|
| JP | H105-305181 | 11/1993 |
| JP | H107-124332 | 5/1995 |
| JP | 3029006 U | 9/1996 |
| JP | H109-146446 | 6/1997 |
| JP | 2001-346286 | 12/2001 |
| JP | 2002-052259 | 2/2002 |
| JP | 2002-066152 | 3/2002 |
| JP | 2002-126359 | 5/2002 |
| JP | 2002-224457 | 8/2002 |
| JP | 2003-251079 | 9/2003 |
| JP | 2008-528062 | 7/2008 |
| JP | 2009-018055 | 1/2009 |
| JP | 2014-000340 | 1/2014 |
| JP | 2015-154219 | 8/2015 |
| JP | 2015-231443 | 12/2015 |

OTHER PUBLICATIONS

International Search Report for PCT/JP2017/003850 dated May 16, 2017.

Hayato Kajiyama et al., "Enhancing Gaming Experience System Using See-Through Head Mounted Display and Posture Detection of Users", IPSJ SIG Notes Mobile Computing and Ubiquitous Communications (MBL), Mar. 7, 2014 (Mar. 7, 2014), 2014-MBL-70, No. 12, pp. 1 to 7 with English Abstract.

\* cited by examiner

US 10,695,669 B2

GAME APPARATUS AND GAME CONTROL METHOD

TECHNICAL FIELD

The present invention relates to a game apparatus and a game control method.

BACKGROUND ART

For a game apparatus including an enclosure provided with a controller, a display, an operation unit, and a seat, a technique has been known that is for enhancing realistic sensation by vibrating or shaking an enclosure or a seat, depending on a situation in a game (see Patent Documents 1 and 2, for example). However, a problem is that, if a large portion of information entering a user's field of vision is information outside a game screen, which is the display, a sense of immersion is lost.

In recent years, a technique has been known that enhances a sense of immersion by expanding, in front of a user, a screen as a display, until close to 180 degrees, so that a large portion of a field of vision is occupied by a game screen (see Patent Document 3, for example). Additionally, a display device has been known that is a "head-mounted display"-type display device such that a user wears the display device on a head like a goggle (see Patent Document 4, for example).

Furthermore, for a movie that is screened at a movie theater, a technique has been known that is for enhancing realistic sensation by causing an audience to experience vibration by vibrating, seats, or by supplying odor or water drops to the audience from smell/water droplet supply devices arranged at backrests of front seats, depending on a situation of the movie screened at the movie theater.

PRIOR ART DOCUMENTS

Patent Documents

Patent Document 1: Japanese Unexamined Patent Publication No. H05-303324
Patent Document 2: Japanese Unexamined Patent Publication No. 2002-052259
Patent Document 3: Japanese Unexamined Patent Publication No. 2015-154219
Patent Document 4: Japanese Unexamined Patent Publication No. 2015-231443

SUMMARY OF THE INVENTION

Problem to be Solved by the Invention

According to related art, a certain effect can be obtained to enhance a sense of immersion to content. However, there is room for improvement to provide further realistic sensation and attractiveness to a user.

Accordingly, an object is to provide a technique with which realistic sensation to a user can be enhanced.

Means for Solving the Problem

A game apparatus is provided with an enclosure including a controller; a display; an operation unit; and a riding part, wherein the game apparatus is further provided with at least one of an actuator that causes a user to perceive shaking or vibration, and a supply unit that causes the user to perceive at least one of wind, water, smell, heat, a cooling sensation, and a tactile sensation, and wherein the controller controls content to be displayed on the display according to a situation of a game and a change in a user's visual point, and the controller controls the actuator or the supply unit according to the situation of the game.

Advantage of the Invention

According to the disclosed technique, realistic sensation to a user can be enhanced.

EMBODIMENTS OF THE INVENTION

In the following, embodiments of the present invention are described based on the drawings.

First Embodiment

Figure 1:
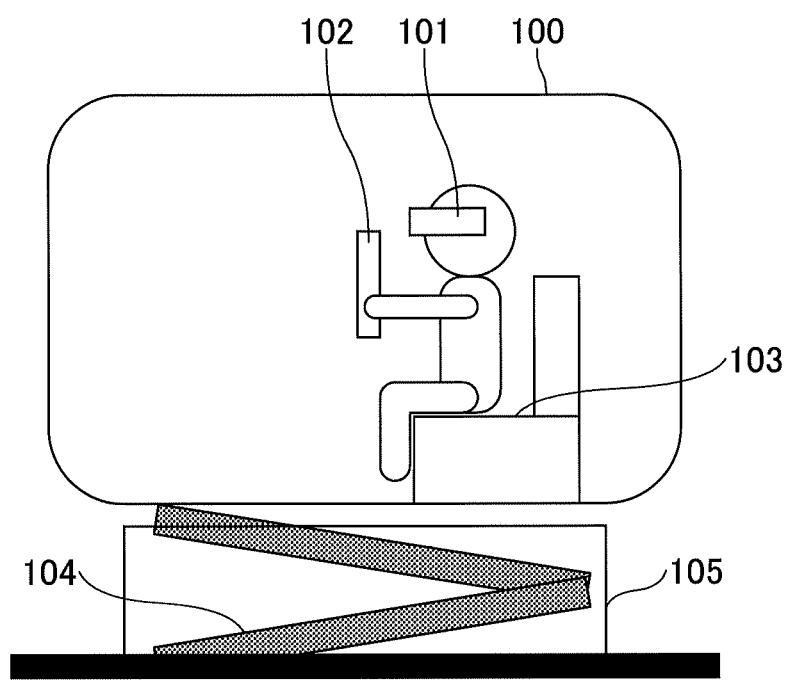
FIG. 1 is a diagram illustrating an example of arrangement of a game system according to a first embodiment.

FIG. 1 is a diagram illustrating an example of arrangement of a game system 1 according to a first embodiment. In FIG. 1, the game system 1 is provided with an enclosure 100; a head mount display 101; a controller 102; a riding part 103; an arm 104; and an actuator 105.

The enclosure 100 has, for example, a shape that simulates an approximately box-shaped vehicle, and the enclosure 100 is an enclosure having an approximately hermetically sealed shape (a sealed type, or a semi-sealed type).

For example, when the enclosure 100 is for one person, and when the enclosure 100 is assumed to be used by the person while the person is sitting on a seat, the height is less than or equal to 2 m; the width is approximately from 1 m to 1.5 m; an opening for forming an entrance is provided in a side wall; and a seat is installed in the vicinity of the center of the floor. A door may be installed at the opening. Here, an inner side of the side wall of the enclosure 100 can be used as a display unit. By preventing from being enlarged too much, shaking and vibration can be more directly transmitted to a user, and the realistic sensation can be enhanced. When the arm 104 is installed at a bottom part of the enclosure 100, a boarding gate is located at a slightly higher position. Accordingly, a ramp may be installed.

The head mount display 101 is a display device to be attached to a head, and the head mount display 101 displays three-dimensional virtual reality (VR: Virtual Reality) video that depends on a user's visual point.

The riding part 103 is, for example, a seat (bench) for one to two people. If a user walks around while using the head mount display 101, the user may fall down or collide with a structure. Accordingly, the riding part 103 is installed, which is for sitting, or for securing a position without sitting. Here, instead of the head mount display 101, for example, a display may be provided on the inner surface of the enclosure 100. In this case, the riding part 103 may not be a seat for sitting.

The controller 102 may be, for example, a known controller for gaming, or a simplified controller having an approximate stick-like shape. Additionally, the controller 102 may be a controller that can be operated by a voice input, or the controller 102 may be a touch panel. Alternatively, for example, the controller 102 may be a virtual touch panel that is obtained by causing the head mount display 101 to display as if there were a touch panel input device in front of eyes, so that a user can input through the virtual touch panel by moving fingers in the air. In this case, for example, a method may be adopted in which, for example, a globe provided with terminals (sensors) for detecting motion of fingers of a user is worn on a user's hand.

The actuator 105 is a device for causing a user to perceive shaking, vibration, etc. The actuator 105 may be installed, for example, at the bottom part of the enclosure 100 through a side part, or the actuator 105 may be installed at an upper part of the enclosure 100. Additionally, the actuator 105 may be installed at a bottom part or at a backrest of the seat of the riding part 103 inside the enclosure 100. Here, a configuration may be adopted such that, instead of the actuator 105, a speaker is installed inside the seat, and a user is caused to perceive vibration by body sonic.

<Hardware Configuration>

Figure 2:
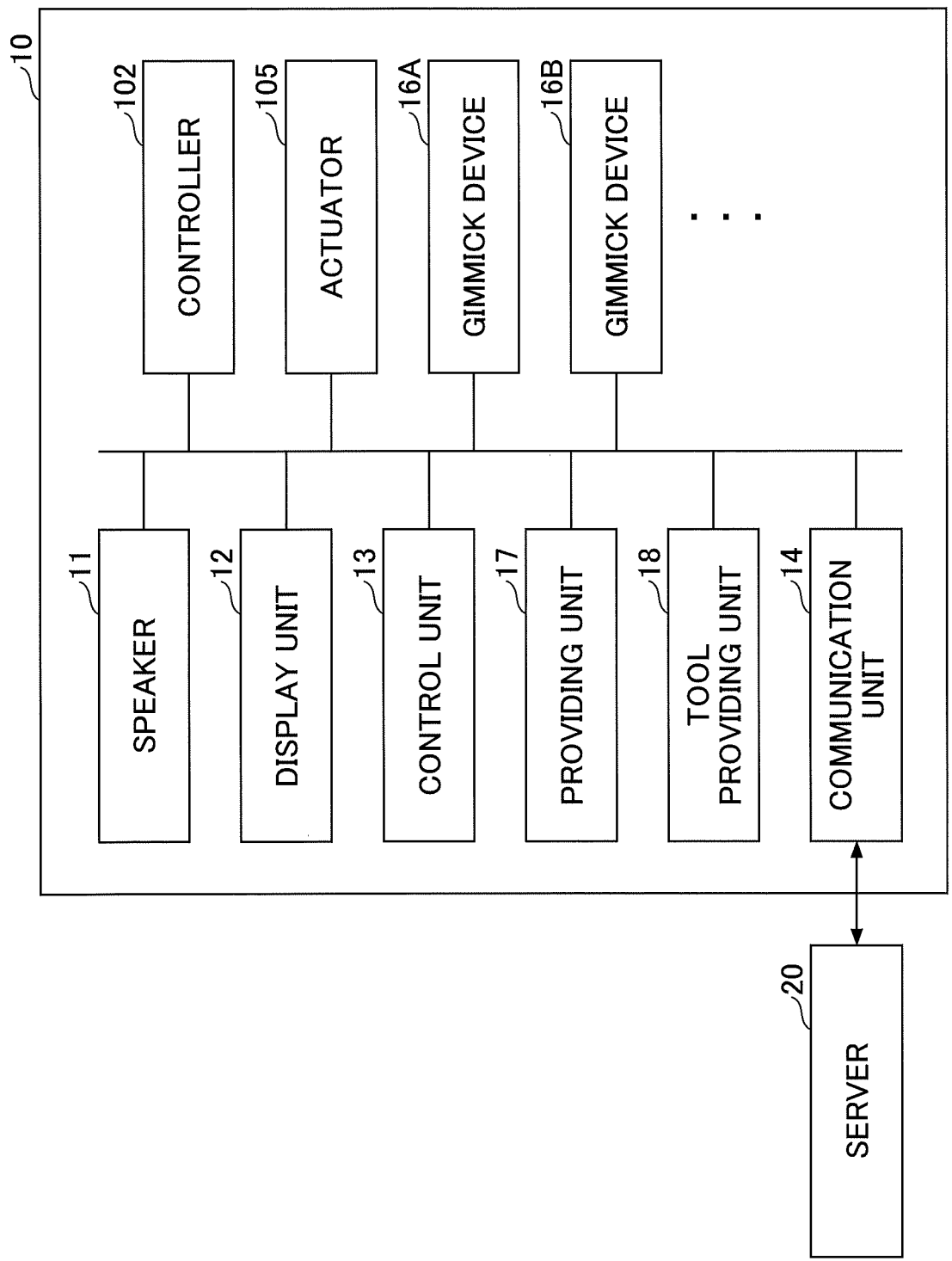
FIG. 2 is a diagram describing an example of a hardware configuration of the game system.

Next, a hardware configuration of the game system 1 is described by referring to FIG. 2. FIG. 2 is a diagram describing an example of the hardware configuration of the game system 1.

The game system 1 is provided with a speaker 11; a display unit 12; a control unit 13; a communication unit 14; a controller 102; an actuator 105; gimmick devices (supply devices) 16A, 16B, . . . (when it is not required to distinguish them, these are simply referred to as "gimmick device 16," hereinafter); a providing unit 17; a tool providing unit 18, etc.

The speaker 11 and the display unit 12 may be installed inside the head mount display 101 of FIG. 1.

The gimmick device 16 is a device for supplying, to a user, wind, water (e.g., water droplets or shower), smell, heat, a cooling sensation, a tactile sensation, etc. The gimmick device 16 may be installed inside the head mount display 101 or the controller 102 of FIG. 1.

The control unit 13 performs various types of control in the game system 1. For example, the control unit 13 controls the head mount display 101, the actuator 105, and the gimmick device 16 depending on a situation of a game (a progress of the game), and the control unit 13 provides, to the user, video, vibration, a tactile sensation, etc., depending on the situation of the game. The control unit 13 may be implemented, for example, by connecting a consumer game machine and a dedicated system board through a universal serial bus (USB), etc.

The communication unit 14 performs communication with a server 20 through a network. The communication unit 14 downloads a part of a game program or all of the game program from the server 20. Additionally, the communication unit 14 allows a game to be played while competing or cooperating with another user playing the same game using another enclosure through a network.

The providing unit 17 provides, to a user, a controller 102 corresponding to a game selected by the user. For example, a part of the inner wall of the enclosure may be made as a door that can be freely opened and closed, and a rotating table holding a plurality of controllers 102 may be installed inside the door. In this case, the providing unit 17 may lend the controller 102 to the user by controlling rotation of the rotating table depending on the game selected by the user. Here, the game system 1 is provided with a plurality of game programs (content items), and a user can make a selection at a start of a game. For example, various game programs and simulation programs may be selected, such as golf, tennis, scuba diving, airplane maneuvering, drive, hunting, riding (including horse racing jockey), searching, etc. When a user selects tennis, the user is allowed to hold an approximately stick-shaped controller 102, which simulates a racket, to play the game.

Alternatively, a configuration may be adopted such that controllers 102 that simulate a handle or a lever may always be prepared in the vicinity of the seat, the wall part, or a floor part in the enclosure 100, and, depending on a selected game, the providing unit 17 may provide the controller 102 by only showing the controller 102 brightly that can be used for the game.

Additionally, the providing unit 17 may present a plurality of controllers 102, so that a user can select a preferred controller 102. For example, for a hunting game, a user may select a stick-shaped controller 102, which simulates a gun, or the user may select a controller 102 provided with a plurality of buttons, which can be used for an ordinary household game. By selecting the former, realistic sensation can be more enhanced, and, by selecting the latter, a game can be smoothly progressed with a familiar controller.

The tool providing unit 18 provides, to a user, a tool for operation or a tool for detection, which differs from the controller 102, depending on content of a game selected by the user. For example, for a scuba diving game, in addition to a controller 102 for controlling underwater movement, a tool simulating a mouthpiece of a regulator is provided. In this case, while a user wears the head mount display 101, the user wears the tool simulating the mouthpiece in the mouth, and the user plays the game using the controller 102. If the tool is provided with a sensor for detecting breathing, the control unit 13 may cause the head mount display 101 to display a situation in which bubbles appear in water in synchronization with user's exhaust, so that a further sense of immersion can be provided.

<Operation>

Figure 3:
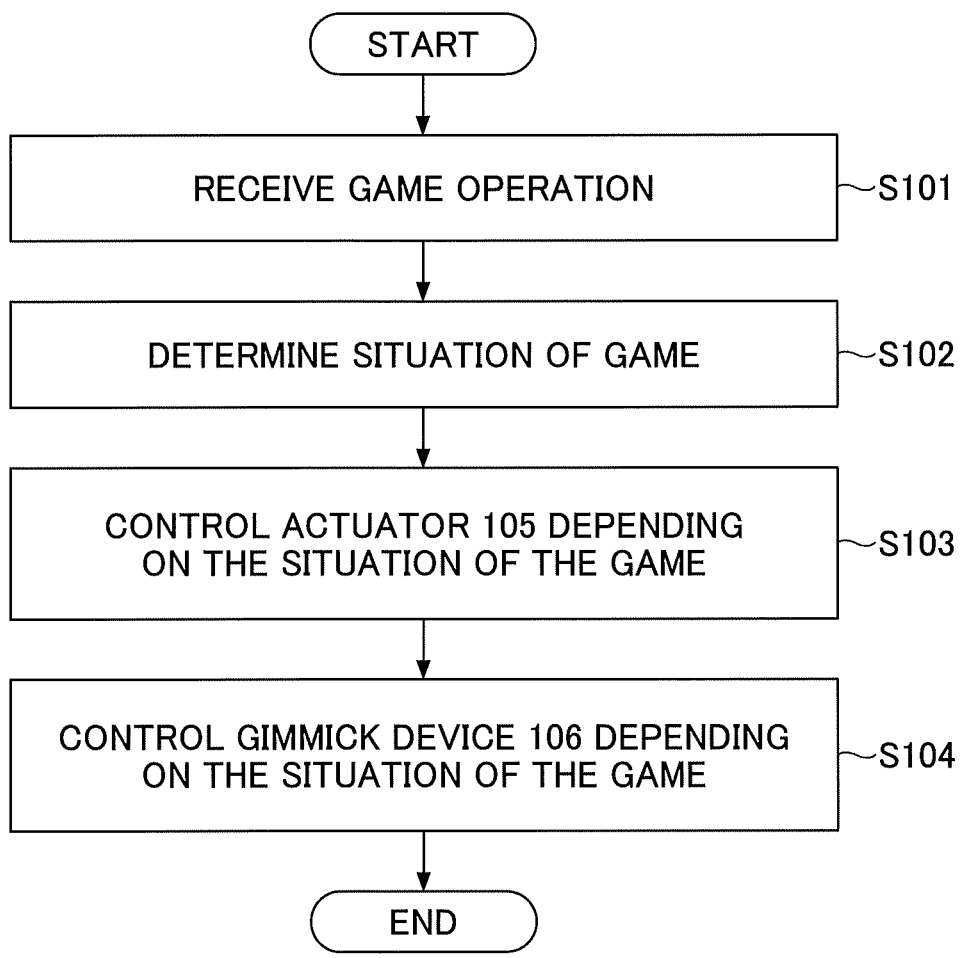
FIG. 3 is a flowchart showing an example of an operation of the game system according to the first embodiment.

Next, an operation of the game system according to the first embodiment is described by referring to FIG. 3. FIG. 3 is a flowchart illustrating an example of an operation of the game system 1 according to the first embodiment.

First, at step S101, the control unit 13 receives a game operation from a user through the controller 102.

Subsequently, the control unit 13 determines a situation in the game (step S102).

Subsequently, the control unit 13 controls the actuator 105 depending on the situation in the game (step S103).

Subsequently, the control unit 13 controls the gimmick device 16 depending on the situation in the game (step S104), and the control unit 13 terminates the process. Here, if, in the game, for example, the user performs an operation to go out of a residence in spite of the storm outside the residence, the control unit 13 uses the gimmick device 16 to spray wind and water (water droplets) to the user. Alternatively, if, in the game, for example, the user moves in a burning residence during fire, the control unit 13 uses the gimmick device 16 to splay hot air to the user. In the situation of the game, if the user touches a door knob, the control unit 13 may control the controller 102, etc., held by the user's hand in the real space to be heated. In this case, for example, a hot feel may be simulated using a peltier element in a grip portion of the controller 102. Furthermore, at a scene of a fire, a smell, such as that caused by burning wood, is usually generated, and, thus, the gimmick device 16 may supply the small, such as that caused by burning wood, to the user. As a result, a further sense of immersion can be provided to the user.

Additionally, the control unit 13 may control the gimmick device 16 depending on a state of the actuator 105. For example, when a user faces upward, if wind and water are sprayed from the gimmick device 16 installed to face the user, water may enter the user's nose. For this reason, when an angle of the seat of the riding part 103 is tilted upward from the horizontal by an angle that is greater than or equal to a predetermined angle (e.g., 10 degrees) by the actuator 105 depending on a situation of the game, the control unit 13 may temporarily stop spraying of wind and water from the gimmick device 16, or the control unit 13 may control spraying of wind and water from the gimmick device 16 so that spraying becomes relatively weak.

Additionally, the control unit 13 may control, depending on a state of a predetermined gimmick device 16A, another gimmick device 16B. For example, if wind and rain are sprayed while a smell (scent) is sprayed, a user may tend not to perceive the smell. For this reason, for example, when the gimmick device 16A sprays a smell, the control unit 13 may temporarily stop spraying of wind and water from the gimmick device 16B for a predetermined time interval (e.g., three seconds), or the control unit 13 may control spraying of wind and water from the gimmick device 16B so that spraying becomes relatively weak for the predetermined time interval.

MODIFIED EXAMPLE

As another embodiment, a screen, as the display unit 12, may be provided on the inner wall, a ceiling, or the floor of the enclosure 100, and a user may wear the head mount display 101. In this case, as the head mount display 101, a see-through type head mount display, with which a user can view an outside situation through a lens, like a normal goggle, is used. Here, if a game to be played in the game system 1 is, for example, a game based on golf, a landscape of a golf course and a landscape of a hole currently played are displayed on a screen on the inner wall of the enclosure 100. At the same time, for example, in a situation in which the user is about to hit the ball in the game, if the user is facing the ground direction, a ball and a golf club held by the hand are displayed on the head mount display 101 worn by the user.

The control unit 13 may generate a pressurizing state inside the enclosure 100 by the gimmick device 16 as a pressure device installed inside the enclosure 100, depending on a situation in the game. For example, if a game situation is a case in which scuba diving is performed or a case of moving inside an elevator, etc., by pressurizing inside the enclosure 100 to cause a user to perceive an increase in the pressure, further realistic sensation can be provided. As a result, unlike a conventional movie, within a highly airtight enclosure 100 having an approximate box shape for a unit of one or two people, a user can enjoy a game with pressurization.

Additionally, the control unit 13 varies weight of the controller 102, depending on a situation in a game. In this case, by a method, such as directly connecting the controller 102 to the enclosure 100, or connecting the controller 102 to the enclosure 100 through a pipe, etc., the controller 102 can be modified, so that fluid, such as water, can be flowed into the controller 102, or fluid can be discharged from the controller 102. For example, in a tennis game, for playing with a virtual player, etc., controlled by a computer, if an opponent is a strong player, the control unit 13 increases the weight of the controller 102 simulating a tennis racket. As a result, a ball to be hit back may be perceived to be heavy, and realistic sensation can be provided. Alternatively, according to user's preference, by increasing the weight of the controller 102, a disadvantageous situation may be intentionally generated, and a difficulty level of the game can be increased.

Additionally, data communication with another terminal device through a wired line or radio may be enabled using the communication unit 14. For example, data (a size, a number, etc.) of prey hunted by a user in a hunting game is transmitted to a terminal device, such as a smartphone or an IC card. Then, by using a specific application program installed in advance in the terminal device, a history can be confirmed, or ranking of results in the same game can be confirmed. As a result, attractiveness to the user can be enhanced.

Additionally, a user prepares a terminal device provided with a data communication function (e.g., game goods, such as a stuffed toy of a character appearing in the game) in advance, and arranges the game goods in the vicinity of the riding part 103 inside the enclosure 100. Here, the game goods are provided with output units, such as speakers, and the game goods voice-output messages of support or hint based on data obtained from the game system 1 during playing of the game. As a result, a user can obtain a sense of immersion, as if the user were playing the game in a state in which there are friends in the vicinity of the user. During the game or at the end of the game, data depending of the game result is stored in storage units of the game goods, and the game history, battle history, etc., of the user accumulated in the past game play are accumulated in the storage units. Then, the control unit 13 may grant an advantage in the game depending on the accumulated content, so that attractiveness can further be enhanced.

<Advantage>

Unlike a conventional game apparatus provided with a vibration function, while the control unit 13 of the game system 1 according to the embodiment varies an image on the head mount display 101 in response to a shift in a visual point of a user or a shift in a visual point of a main character in a game, the control unit 13 controls the actuator 105 to cause the user to perceive vibration, etc. This differs from a technique of attaching vibration feeling in a conventional movie, and vibration is not uniformly provided to a user at a timing prepared in advance. A situation in a game varies depending on a user's selection or action, and by providing vibration, etc., to the user in response to the variation, an effect can be obtained such that realistic sensation and a sense of immersion can be enhanced.

Second Embodiment

In a second embodiment, specific examples are described for cases where a horror game is played and a hose racing (jockey) game is played, in the game system 1. Here, since the second embodiment is the same as the first embodiment except a part of the second embodiment, a description is appropriately omitted. In the following, description of a part common to the first embodiment is omitted, and only the different part is described.

Figure 4:
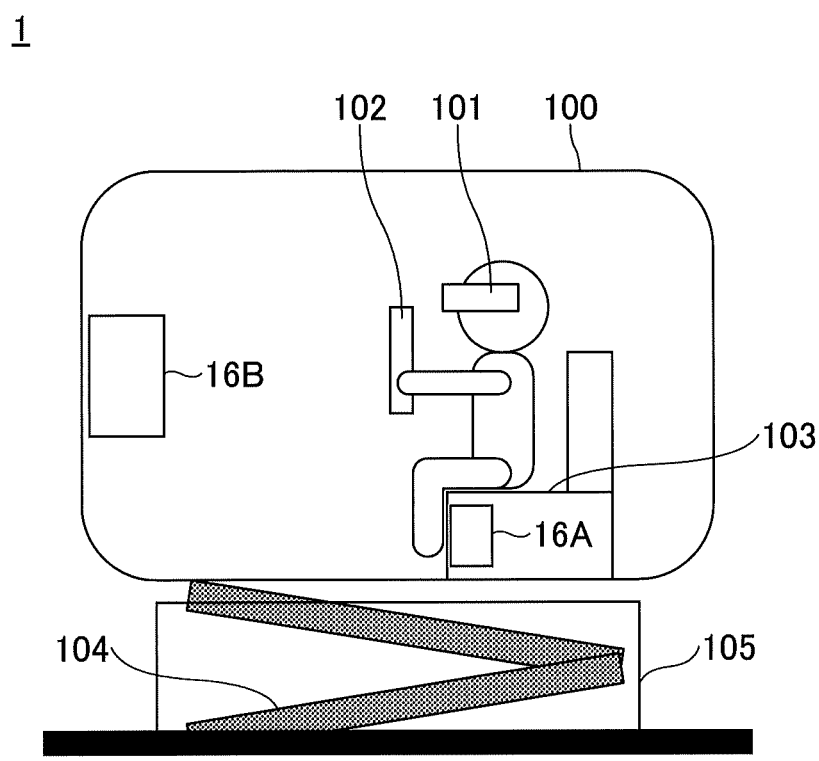
FIG. 4 is a diagram illustrating an example of arrangement of a game system according to a second embodiment.

FIG. 4 is a diagram illustrating an example of arrangement of the game system 1 according to the second embodiment. In FIG. 4, the game system 1 is provided with a touch gimmick device 16A and a wind gimmick device 16B, as the gimmick device 16. The touch gimmick device 16A is installed, for example, at a lower part of the riding part 103. The wind gimmick device 16B is installed, for example, at a position facing the riding part 103.

Figure 5A:
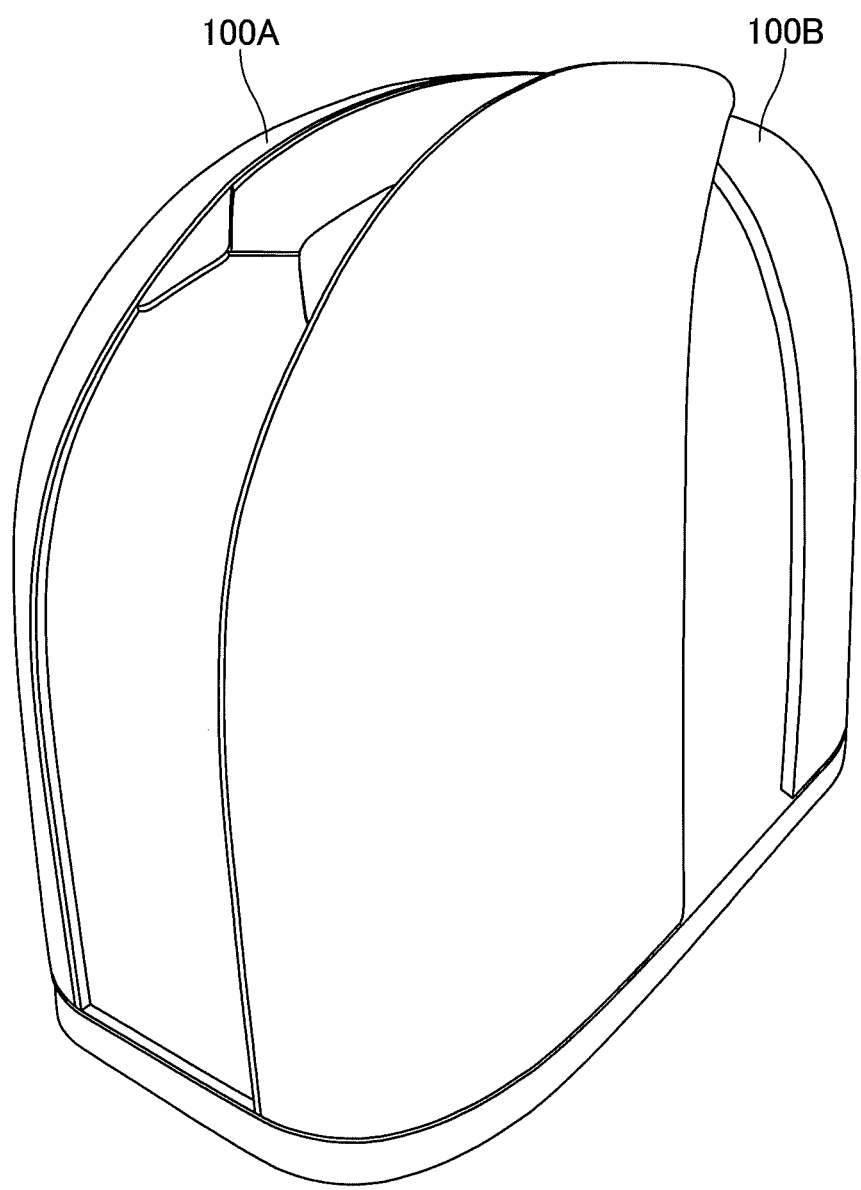
FIG. 5A is a diagram illustrating an example of an enclosure according to the second embodiment.
Figure 5B:
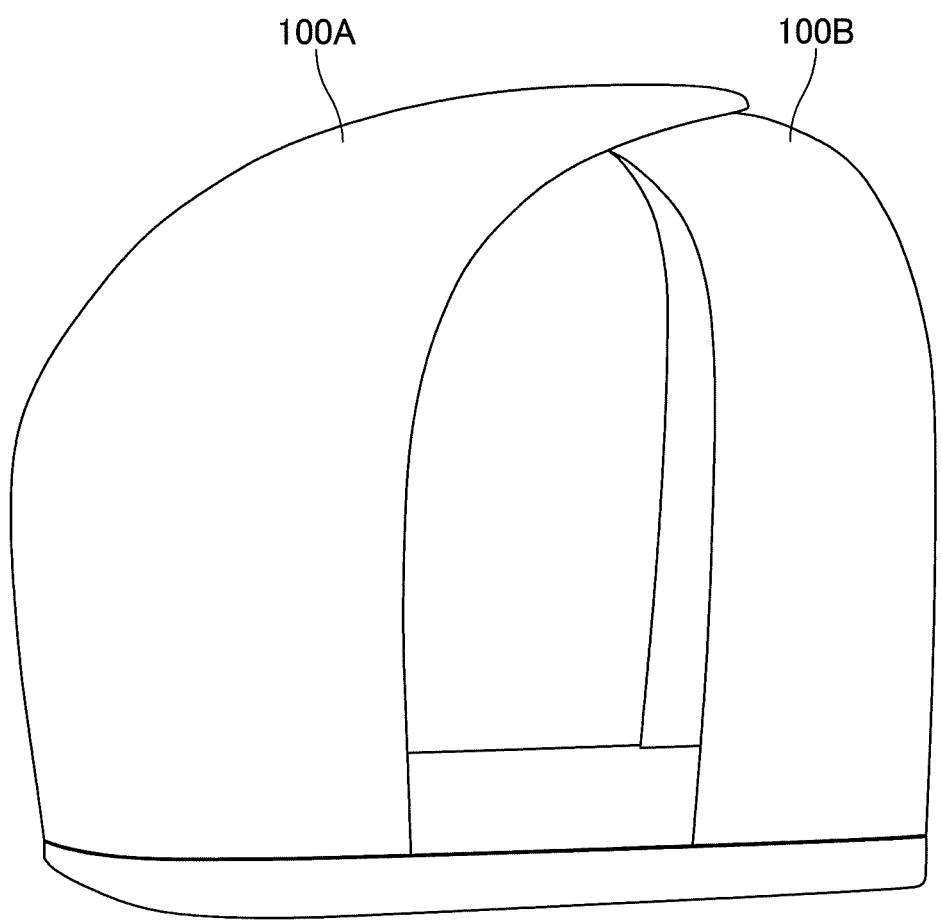
FIG. 5B is a diagram illustrating the example of the enclosure according to the second embodiment.

FIG. 5A and FIG. 5B are diagrams illustrating an example of an enclosure 100 according to the second embodiment. FIG. 5A shows an example of a case in which the enclosure 100 is viewed diagonally from the front. FIG. 5B shows an example of a case in which the enclosure 100 is laterally viewed. The enclosure 100 is provided with a front enclosure 100A and a rear enclosure 100B. The front enclosure 100A and the rear enclosure 100B are arranged, so that a user can enter inside from a space between the front enclosure 100A and the rear enclosure 100B.

Figure 6:
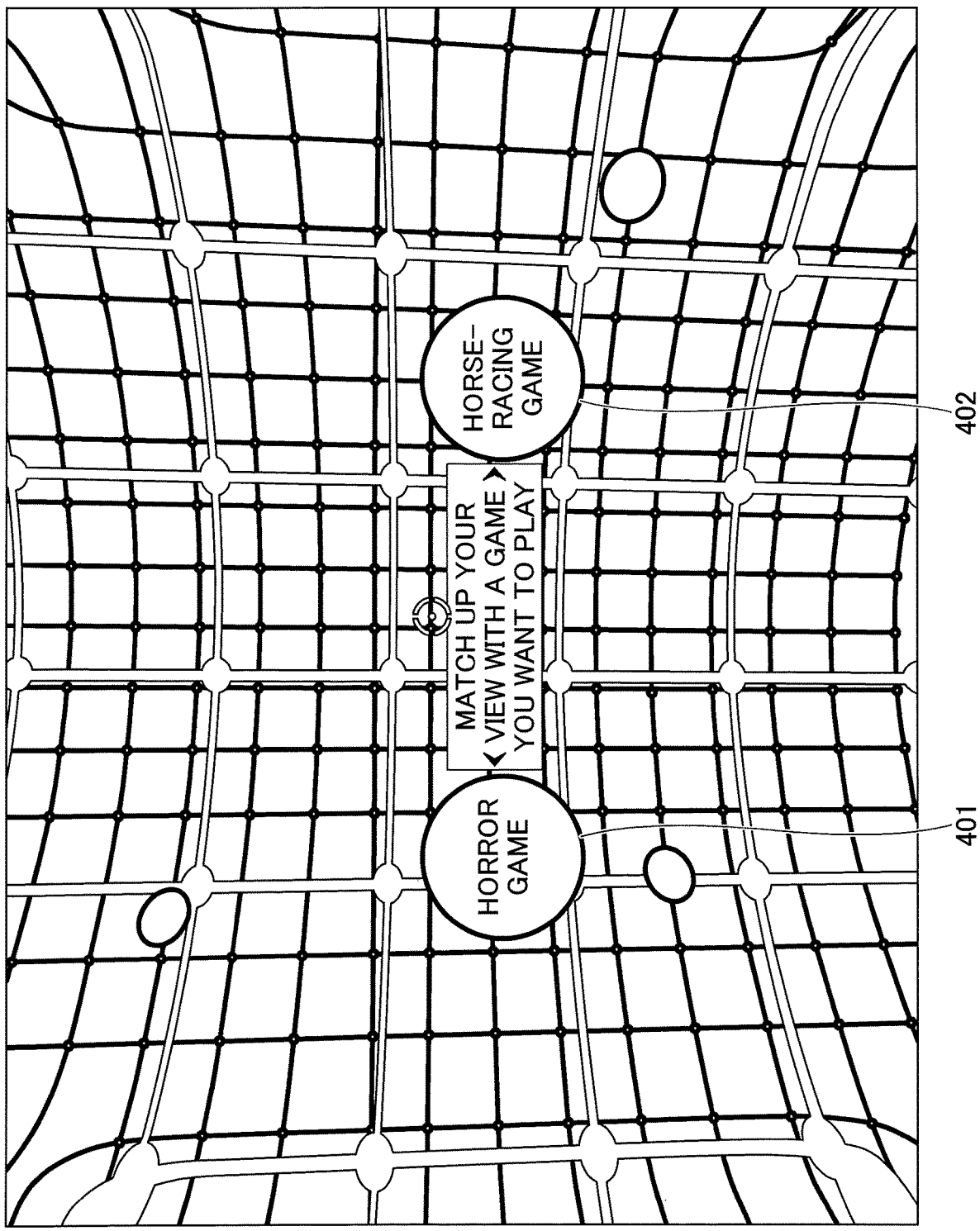
FIG. 6 is a diagram illustrating an example of a game selection screen.

FIG. 6 is a diagram illustrating an example of a game selection screen. A selection screen 400 illustrated in FIG. 6 is displayed on the head mount display 101. A user can select a horror game 401 or a horse racing game 402 by an operation using a line of sight, for example.

Figure 7A:
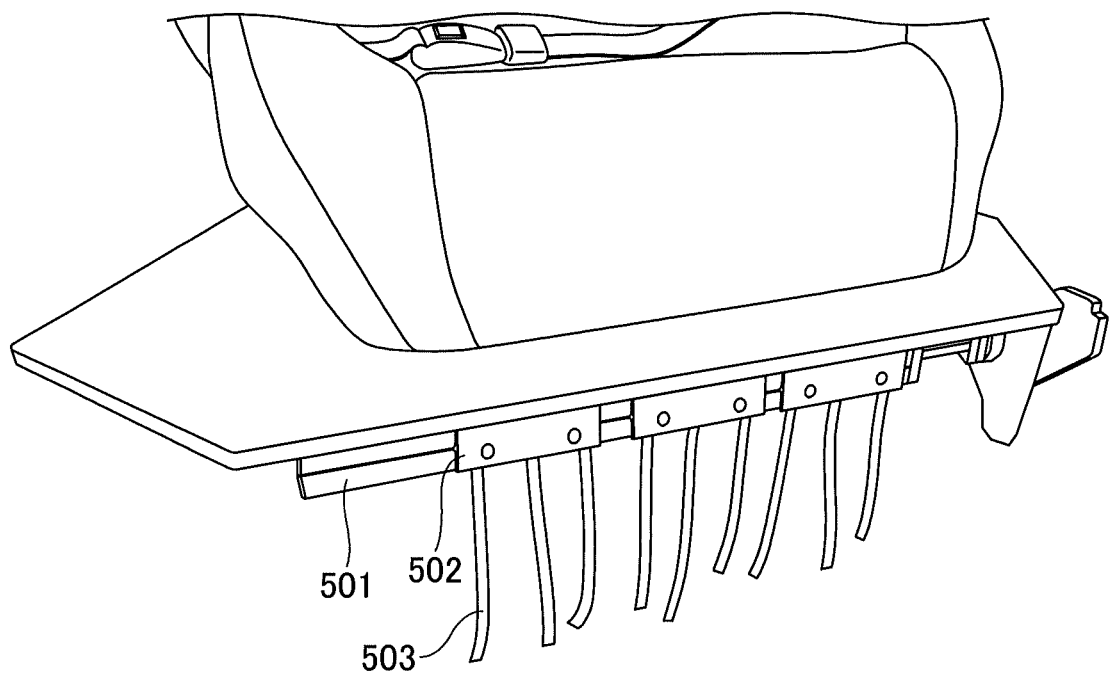
FIG. 7A is a diagram describing an example of a touch gimmick device.
Figure 7B:
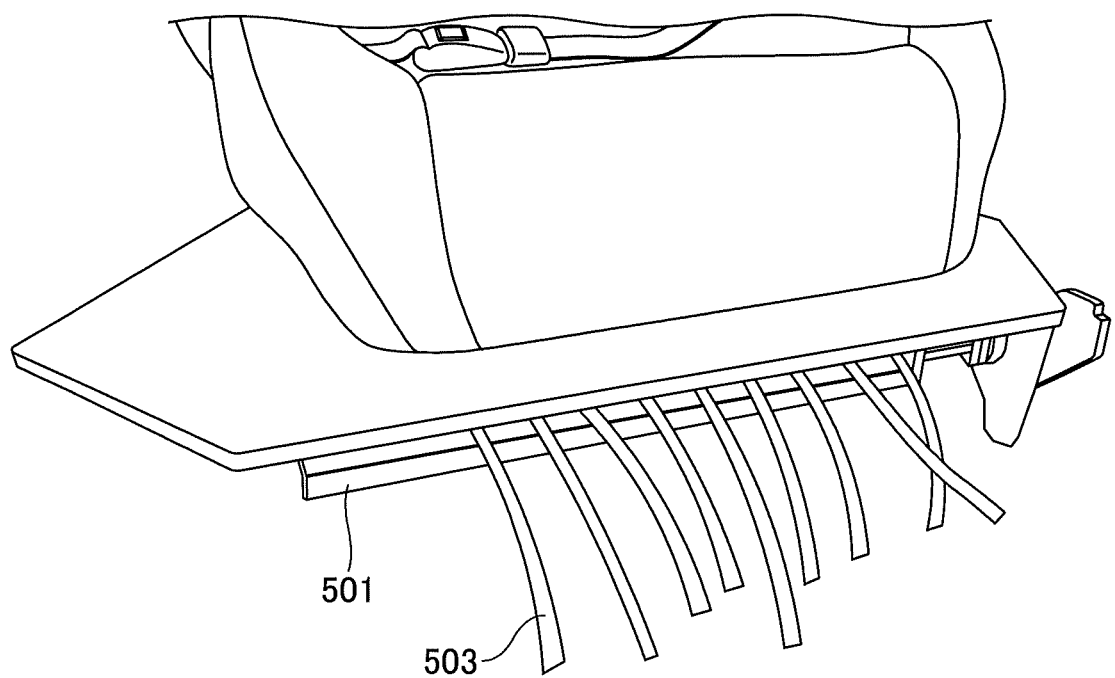
FIG. 7B is a diagram describing the example of the touch gimmick device.

FIG. 7A and FIG. 7B are diagrams illustrating an example of the touch gimmick device 16A. In the example of FIG. 7A and FIG. 7B, nine films 503 formed of a soft material, such as a poly-tube, are attached to the touch gimmick device 16A by attachment members 502 at positions in an upper part of a rod-shaped member (roll) 501 extending in a left-right direction.

As illustrated in FIG. 7A, when the rod-shaped member 501 is not moving, the attachment members 502 and the films 503 are directed approximately vertically downward. As illustrated in FIG. 7B, when the rod-shaped member 501 is rotated, the attachment members 502 and the films 503 are directed approximately horizontally. For example, a gear is attached to the rod-shaped member 501, and the direction of the attachment members 502 is repeatedly changed between an approximate vertical direction and an approximate horizontal direction, as the gear rotates. For example, while the rod-shaped member 501 rotates once, the direction of the attachment members 502 is changed three times between the approximate vertical direction and the approximate horizontal direction. As a result, a user can be caused to perceive a tactile sensation, as if the user were touched by something.

At step S104, for example, if, in the horror game 401, a small animal running underfoot is displayed on the head mount display 101, the control unit 13 causes the rod-shaped member 501 of the touch gimmick device 16A installed at the lower part of the riding part 103 to rotate. As a result, the films 503 of the touch gimmick device 16A repeatedly contact the user's calf part, so that user can be caused to perceive a tactile sensation, as if the user were touched by something underfoot. Here, the touch gimmick device 16A may cause to perceive a tactile sensation by using compressed air, for example.

Figure 8A:
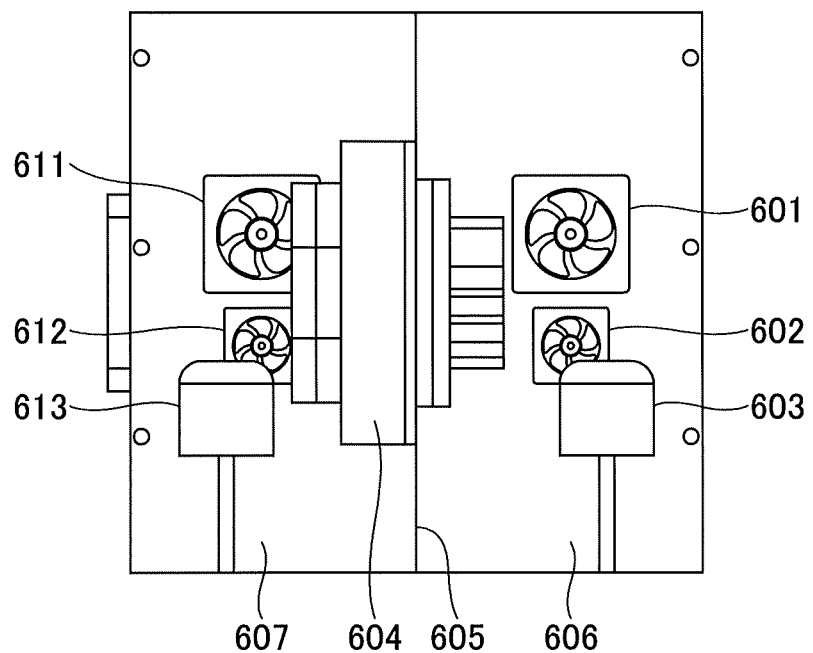
FIG. 8A is a diagram describing an example of a wind gimmick device.
Figure 8B:
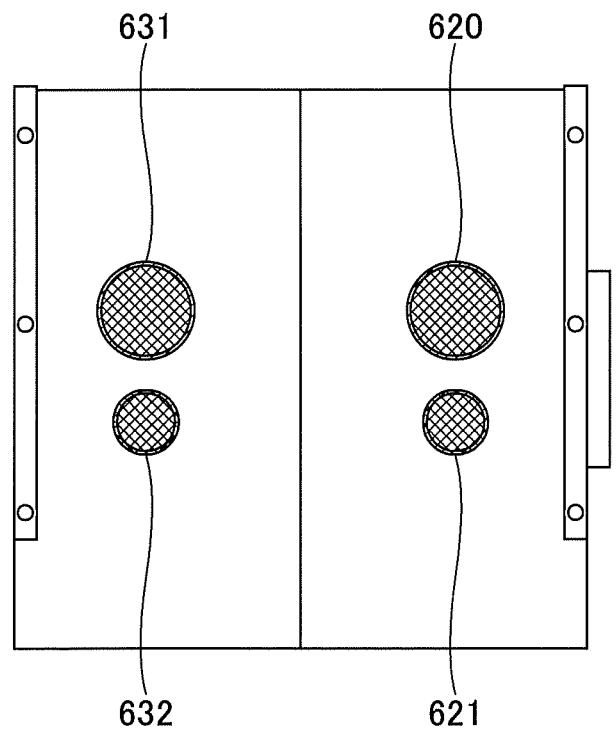
FIG. 8B is a diagram describing the example of the wind gimmick device.

FIG. 8A and FIG. 8B are diagrams illustrating an example of the wind gimmick device 16B. In the example of FIG. 8A and FIG. 8B, the wind gimmick device 16B is provided with, at a side of a space 606 partitioned by a partition 605, fans 601 and 602; a humidifier 603; and air outlets 631 and 632. Fans 611 and 612, a humidifier 613, and air outlets 620 and 621 are provided at a side of the other space 607 partitioned by the partition 605. Additionally, a peltier element 604 is provided in the partition 605.

When an electric current flows in the peltier element 604, the peltier element 604 absorbs heat on a surface at the side of the space 606 of the partition 605, and the peltier element 604 generates heat on a surface at the side of the space 607 of the partition 605.

The humidifiers 603 and 613 are devices for emitting water vapor (mist), and, for example, the humidifiers 603 and 613 may be steam-type humidifiers for humidifying using steam of boiling water, ultrasonic-type humidifiers for humidifying by generating mist of water by ultrasonic waves, or evaporation-type humidifiers for humidifying by blowing air to a filter containing water.

The wind gimmick device 16B sends cold air from the air outlet 631 using the peltier element 604 and the fan 601. Additionally, the wind gimmick device 16B sends cold wind with mist from the air outlet 632 using the peltier element 604, the humidifier 603, and the fan 602.

Similarly, the wind gimmick device 16B sends hot air from the air outlet 620 using the peltier element 604 and the fan 611. Additionally, the wind gimmick device 16B sends hot wind with mist from the air outlet 621 using the peltier element 604, the humidifier 613, and the fan 612.

Here, the wind gimmick device 16B can also send wind at ambient temperature without driving the peltier element 604.

At step S104, for example, in the horse racing game 402, during riding a horse for racing, the control unit 13 controls the wind gimmick device 16B, so that a user is caused to perceive feeling, as if wind, rain, snow, etc., were blowing from the front. For example, for causing to perceive rain, while the control unit 13 causes the head mount display 101 to display video of blowing rain, the control unit 13 causes the wind gimmick device 16B to discharge wind with mist from the air outlet 632 using the humidifier 603 and the fan 602. Alternatively, wind with mist is caused to be discharged from the air outlet 621 using the humidifier 613 and the fan 612.

Additionally, for example, for causing to perceive snow, while the control unit 13 causes the head mount display 101 to display video of blowing snow, the control unit 13 causes the wind gimmick device 16B to discharge cold wind with mist from the air outlet 632 using the peltier element 604, the humidifier 603, and the fan 602. In this case, since the user is watching the video of blowing snow using the head mount display 101, the user perceives, as if the cold wind with mist were snow. Accordingly, the user can be caused to perceive feeling, as if snow were blowing to the user.

<Conclusion>

According to the above-described embodiment, there is provided, in the game system 1, the enclosure 100 including the control unit 13, the head mount display 101, the controller 102, and the riding part 103. The control unit 13 controls content displayed on the head mount display 101 in response to a change in a user's visual point, and the actuator 105 for causing the user to perceive shaking or vibration is installed in the riding part 103 or in the enclosure 100. As a result, realistic sensation provided to the user can be enhanced.

The embodiments of the present invention are described in detail above. However, the present invention is not limited to the specific embodiments, and various modifications and alterations may be made within the scope of the gist of the present invention set forth in the claims.

The control unit 13 may be implemented, for example, by cloud computing formed of one or more computers.

The present application claims the benefit of U.S. Provisional Application No. 62/341,250 filed on May 25, 2016, the entire content of which is hereby incorporated herein by reference.

DESCRIPTION OF THE REFERENCE NUMERALS

1 Game system (an example of "game apparatus")
100 Enclosure
101 Head mount display (an example of "display")
102 Controller (an example of "operation unit")
103 Riding part
104 Arm
105 Actuator
11 Speaker
12 Display unit
13 Control unit
14 Communication unit
16 Gimmick device (an example of "supply unit")
17 Providing unit
18 Tool providing unit

The invention claimed is:

1. A game apparatus comprising: an enclosure including a controller, a display, an operation unit, and a riding part, wherein the game apparatus further includes at least one of an actuator for causing a user to perceive shaking or vibration and a supply unit for causing the user to perceive at least one of wind, water, smell, heat, a cooling sensation, and a tactile sensation, and wherein the controller controls content displayed on the display depending on a situation in a game and a change in a user's visual point, and the controller controls the actuator or the supply unit according to the situation in the game;
wherein the enclosure has an approximately hermetically sealed shape, and wherein the game apparatus further includes a device adapted to apply pressure to the user in the enclosure, depending on the situation in the game.

2. The game apparatus according to claim 1, wherein the display has a shape adapted to being worn on a head of the user.

3. The game apparatus according to claim 1, wherein the display includes a first display and a second display, wherein the first display is secured to the enclosure, and wherein the second display has a shape adapted to being worn on a head of the user.

4. The game apparatus according to claim 3, wherein the first display displays a landscape depending on the situation in the game, and wherein the second display displays an object that moves in accordance with a user's operation.

5. The game apparatus according to claim 1, wherein the controller allows the user to select one of a plurality of games, and wherein the game apparatus further includes a providing unit that provides, to the user, the operation unit corresponding to the game selected by the user.

6. The game apparatus according to claim 5, wherein the game apparatus further includes a tool providing unit that provides an operation tool or a detection tool to the user, wherein the operation tool or the detection tool differs from the operation unit provided by the providing unit.

7. The game apparatus according to claim 1, wherein the game apparatus further includes a device that changes weight of the operation unit, depending on the situation in the game and when the user operates the operation unit, to cause the user to perceive weight gain or high load.

8. The game apparatus according to claim 1, wherein the game apparatus is connected to a server through a network, and wherein the game apparatus executes a game with another game apparatus via the server.

9. The game apparatus according to claim 1, wherein the game apparatus communicates game history data with a terminal device by wired or wireless communication.

10. The game apparatus according to claim 1, wherein the supply unit includes a first supply unit for causing the user to perceive the tactile sensation, and wherein the supply unit is installed at a lower part of the riding part, and the supply unit causes the user to perceive the tactile sensation, depending on the situation of the game.

11. The game apparatus according to claim 10, wherein the first supply unit causes the user to perceive the tactile sensation by changing, by a rotation of a roll, a direction of a film arranged at an upper part of the roll from an approximate vertical direction to an approximate horizontal direction.

12. The game apparatus according to claim 1, wherein the supply unit supplies cold wind with mist using a peltier element, a humidifier, and a fan, and wherein, while the controller causes the display to display video of blowing snow, the controller causes the supply unit to supply the cold wind with mist.

13. The game apparatus according to claim 1, wherein the controller controls the supply unit depending on the situation in the game and a state of the actuator.

14. The game apparatus according to claim 1 wherein the supply unit further includes a second supply unit that causes the user to perceive the smell, and a third supply unit that causes the user to perceive the wind or the water, and wherein the controller controls the third supply unit depending on the situation in the game and a state of the second supply unit.

15. A game control method comprising: controlling, by a game apparatus, content displayed on a display depending on a situation in a game and a change in a users visual point, and controlling, by the game apparatus, an actuator or a supply unit according to the situation in the game, wherein the game apparatus includes an enclosure including a controller, the display, an operation unit, and a riding part; and at least one of the actuator that causes the user to perceive shaking or vibration, and the supply unit that causes the user to perceive at least one of wind, water, smell, heat, a cooling sensation, and a tactile sensation;
wherein the enclosure has an approximately hermetically sealed shape, and wherein the game apparatus further includes a device adapted to apply pressure to the user in the enclosure, depending on the situation in the game.

* * * * *